(12) United States Patent
Paquette et al.

(10) Patent No.: US 9,321,652 B2
(45) Date of Patent: Apr. 26, 2016

(54) CONTINUOUS-FEED FURNACE ASSEMBLY AND PROCESSES FOR PREPARING AND CONTINUOUSLY THERMALLY EXFOLIATING GRAPHITE OXIDE

(75) Inventors: Michael S. Paquette, Midland, MI (US); Thomas D. Gregory, Midland, MI (US)

(73) Assignee: Dow Global Technologies LLC

( * ) Notice: Subject to any disclaimer, the term of this patent is extended or adjusted under 35 U.S.C. 154(b) by 984 days.

(21) Appl. No.: 12/754,840

(22) Filed: Apr. 6, 2010

(65) Prior Publication Data

US 2010/0266476 A1    Oct. 21, 2010

Related U.S. Application Data

(60) Provisional application No. 61/169,334, filed on Apr. 15, 2009.

(51) Int. Cl.

| | | |
|---|---|---|
| *C01B 31/04* | (2006.01) | |
| *B01J 8/18* | (2006.01) | |
| C01B 31/00 | (2006.01) | |
| C01B 31/02 | (2006.01) | |
| B01J 8/00 | (2006.01) | |
| B01J 19/00 | (2006.01) | |
| B01J 19/24 | (2006.01) | |

(52) U.S. Cl.
CPC ........... *C01B 31/0423* (2013.01); *C01B 31/043* (2013.01); *C01P 2006/12* (2013.01); *C01P 2006/82* (2013.01)

(58) Field of Classification Search
CPC .............. B01J 8/00; B01J 8/18; B01J 8/1836; B01J 19/00; B01J 19/24; C01B 31/00; C01B 31/02; C01B 31/04; C01B 31/0423; C01B 31/043; C01P 2006/12; C01P 2006/80; C01P 2006/82
USPC ................... 422/232, 415.1, 447.3, 448, 460; 110/267; 34/284; 423/415.1, 447.3, 423/448, 460, 414, 447.1, 445 R; 44/129, 44/139, 211, 232

See application file for complete search history.

(56) References Cited

U.S. PATENT DOCUMENTS

| | | | |
|---|---|---|---|
| 6,287,694 B1 * | 9/2001 | Zaleski et al. | ................. 428/402 |
| 6,432,336 B1 | 8/2002 | Mercuri et al. | |
| 2001/0038909 A1 | 11/2001 | Mercuri et al. | |
| 2003/0012722 A1 | 1/2003 | Liu | |
| 2006/0241237 A1 * | 10/2006 | Drzal et al. | ................... 524/495 |

(Continued)

FOREIGN PATENT DOCUMENTS

| | | |
|---|---|---|
| JP | 49-001551 | 1/1974 |
| WO | 8806488 | 9/1988 |
| WO | 99/46437 | 9/1999 |

(Continued)

OTHER PUBLICATIONS

Bissessur et al., "Intercalation of polypyrrole into graphite oxide", Synthetic Metals, 2006, pp. 1023-1027, vol. 156, Elsevier B.V.

(Continued)

*Primary Examiner* — Natasha Young

(57) ABSTRACT

The present invention relates to a continuous-feed furnace assembly and processes for preparing and continuously thermally exfoliating graphite oxide to give a highly exfoliated graphite.

12 Claims, 1 Drawing Sheet

(56) References Cited

U.S. PATENT DOCUMENTS

2009/0072448 A1    3/2009  Shi et al.
2011/0114897 A1*  5/2011  Aksay et al. .................. 252/511

FOREIGN PATENT DOCUMENTS

| WO | 02085517 | 10/2002 |
|---|---|---|
| WO | 2007015710 | 2/2007 |
| WO | 2007047084 | 4/2007 |
| WO | 2007064942 | 6/2007 |
| WO | 2009018204 | 2/2009 |
| WO | 2009/134492 A2 | 11/2009 |

OTHER PUBLICATIONS

Hummers et al., "Preparation of Graphite Oxide", Mar. 20, 1958, p. 1339.
Seredych et al., "Adsorption of ammonia on graphite oxide/aluminum polycation and graphite oxide/zirconium-aluminum polyoxycation composites", Journal of Colloid and Interface Science, 2008, pp. 25-35, vol. 324, No. 1-2, Elsevier Inc.
Staudenmaier, Ber. Dtsh. Chem. Ges., 1898, 31, 1484.
Szabo et al., "Enhanced acidity and pH-dependent surface charge characterization of successively oxidized graphite oxides", Carbon, 2006, pp. 537-545, vol. 44, No. 3, Elsevier Ltd.

\* cited by examiner

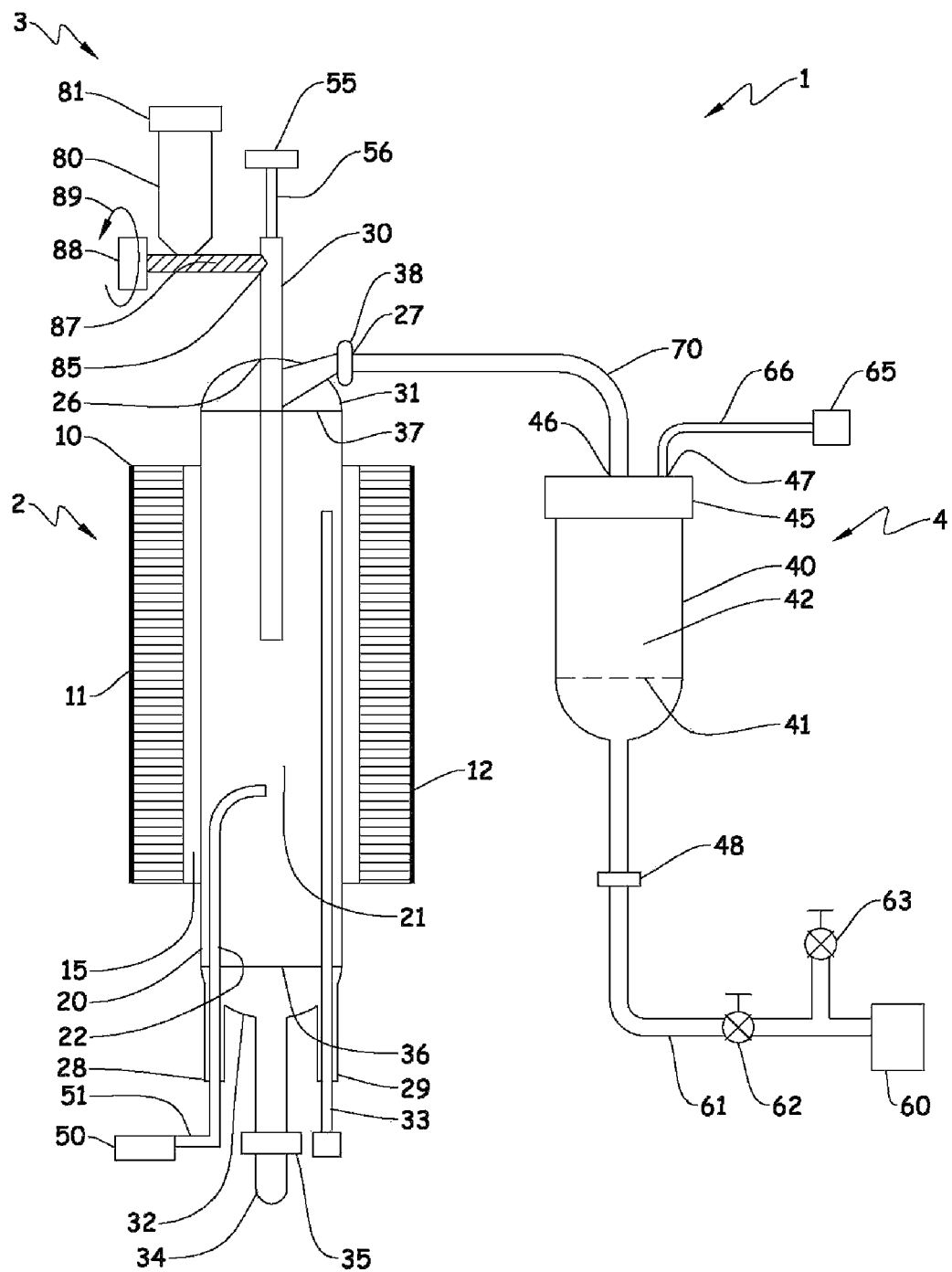

US 9,321,652 B2

CONTINUOUS-FEED FURNACE ASSEMBLY AND PROCESSES FOR PREPARING AND CONTINUOUSLY THERMALLY EXFOLIATING GRAPHITE OXIDE

CROSS-REFERENCE TO RELATED APPLICATIONS

This application claims benefit from U.S. Provisional Patent Application No. 61/169,334, filed 15 Apr. 2009, the entire contents of which are hereby incorporated by reference herein.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to a continuous-feed furnace assembly and processes for preparing and continuously thermally exfoliating graphite oxide to give a highly exfoliated graphite.

2. Description of the Related Art

There is a need in the art for an improved process for drying graphite oxide produced by a Staudenmaier synthesis (Staudenmaier, L., *Ber. Dtsh. Chem. Ges.*, 1898, 31, 1484), or variants thereof such as in WO 2007/047084 (Prud'homme et al.) or WO 2009/018204. The resulting dried graphite oxide would be sufficiently dry and primed for exfoliation that it could be thermally exfoliated to give the aforementioned highly exfoliated graphite, preferably an ultrahighly exfoliated graphite having a BET surface area of 900 square meters per gram ($m^2/g$) or higher. There is also a need in the art for a continuous process (as opposed to a batch process) of thermally exfoliating graphite oxide, especially the purified graphite oxide, to give the highly exfoliated graphite.

BRIEF SUMMARY OF THE INVENTION

In a first embodiment, the present invention provides a process for manufacturing freeze-dried isolated graphite oxide, the process comprising steps of: (a) mixing in a reaction vessel a reaction mixture comprising the following starting materials: a sulfuric acid, an inorganic source of nitrate anion, a first amount of a chlorate salt, and a graphite the reaction mixture having a liquid portion and a solid portion; (b) allowing the reaction mixture to react to form graphite oxide; (c) separating the graphite oxide from most of the liquid portion (e.g., 90 weight percent or more of the liquid portion) of the reaction mixture to give a collected graphite oxide; and (d) freeze-drying the collected graphite oxide to give a freeze-dried isolated graphite oxide, the freeze-dried isolated graphite oxide being characterized as containing less than 5 weight percent of water based on total weight of the freeze-dried isolated graphite oxide and being capable of being thermally exfoliated for 30 seconds at 1000 degrees Celsius to give a highly exfoliated graphite having a Brunauer-Emmett-Teller surface area of 900 square meters per gram or higher. In another embodiment, the invention provides the freeze-dried isolated graphite oxide prepared according to the process of the first embodiment.

In a second embodiment, the present invention provides a continuous-feed furnace assembly comprising a flow-through oven, a means for continuously adding a particulate precursor material, and a means for collecting a particulate product material, the flow-through oven defining spaced-apart particulate inlet and outlet apertures and an enclosed volumetric space between the particulate inlet and outlet apertures, the flow-through oven being capable of heating the enclosed volumetric space at a temperature of from 600 degrees Celsius to about 1600 degrees Celsius; the means for continuously adding a first particulate material being in sequential fluid communication with the particulate inlet aperture, enclosed volumetric space, and particulate outlet aperture of the flow-through oven and the means for collecting a particulate product material, thereby establishing a particulate flow pathway.

In a third embodiment, the present invention provides a process for thermal exfoliation of graphite oxide to continuously manufacture exfoliated graphite, the process comprising steps of: (a) providing the continuous-feed furnace assembly of the second embodiment, wherein the means for continuously adding a particulate precursor material contains a graphite oxide and the enclosed volumetric space of the flow-through oven of the continuous-feed furnace assembly is heated at a temperature of from 600 degrees Celsius to about 1600 degrees Celsius; (b) continuously feeding the graphite oxide from the means for continuously adding a particulate precursor material through the particulate inlet aperture into the flow-through oven of the continuous-feed furnace to produce an exfoliated graphite therein; (c) continuously removing the exfoliated graphite from the flow-through oven via the particulate outlet aperture thereof to give a removed exfoliated graphite; and (d) collecting the removed exfoliated graphite using the means for collecting a particulate product material to give an isolated exfoliated graphite, thereby establishing a continuous flow of particles through the particulate flow pathway.

In another embodiment, the present invention provides a freeze-dried graphite oxide prepared according to the process of the first embodiment. In another embodiment, the present invention provides an ultrahighly exfoliated graphite prepared by thermally exfoliating the freeze-dried graphite oxide according to the process of the third embodiment.

Freeze-dried isolated graphite oxide prepared from graphite via the Staudenmaier synthesis or variant thereof according to the process of the first embodiment is of substantially higher quality, especially as an intermediate for preparing highly exfoliated graphite for filler purposes, compared to the quality of oven-dried graphite oxide prepared from graphite via the same Staudenmaier synthesis or variant thereof. For example, the freeze-dried isolated graphite oxide is capable of producing an ultrahighly exfoliated graphite having a BET surface area of 900 $m^2/g$ or higher versus a BET surface area of ultrahighly exfoliated graphite produced from the oven-dried graphite oxide of 783 $m^2/g$ or less. Correspondingly, the median particle size of the former ultrahighly exfoliated graphite (produced from freeze-dried isolated graphite oxide) is significantly lower than the median particle size of the latter ultrahighly exfoliated graphite (produced from oven-dried graphite oxide). Also, the continuous-feed furnace assembly of the second embodiment is useful in the continuous-feed thermal exfoliation process of the third embodiment, which together produce ultrahighly exfoliated graphite that can be used to make polymer-ultrahighly exfoliated graphite composites having significantly lower (less than 50% of) resistivity than resistivity of corresponding polymer-ultrahighly exfoliated graphite composites produced by a conventional batch thermal exfoliation process. The process of the third embodiment produces ultrahighly exfoliated graphite at a faster rate (i.e., higher number of grams produced per hour) and more economically than conventional batch thermal exfoliation processes.

Highly exfoliated graphite, including the ultrahighly exfoliated graphite having a BET surface area of 900 $m^2/g$ or higher produced by a process of the first or third embodiment, is especially useful as a filler in polymer-highly exfoliated graphite composites. The polymer-highly exfoliated graphite composites are useful materials for preparing, for example, molded articles such as interior automobile parts.

Additional embodiments are described in accompanying drawing(s) and the remainder of the specification, including the claims.

BRIEF DESCRIPTION OF THE DRAWING(S)

Some embodiments of the present invention are described herein in relation to the accompanying drawing(s), which will at least assist in illustrating various features of the embodiments.

FIG. 1 shows an elevation, partial cutaway view of an example of a continuous-feed furnace assembly of the second embodiment.

DETAILED DESCRIPTION OF THE INVENTION

FIG. 1 shows an elevation, partial cutaway view of an example of the continuous-feed furnace assembly of the second embodiment. In FIG. 1, continuous-feed furnace assembly 1 comprises flow-through oven assembly 2, powder addition funnel assembly 3, funnel assembly 4, entraining gas source 50, gas line 51, entraining gas source 55, gas line 56, vacuum source 60, vacuum line 61, manometer 65, gas line 66, and glass conduit 70.

Flow-through oven assembly 2 (an example of the flow-through oven used in the continuous-feed furnace assembly of the second embodiment) comprises tube furnace oven 10 (e.g., series 3210 oven with 1100 degrees Celsius (° C.) heating elements; supplied by Applied Test Systems, Inc., Butler, Pa., USA), quartz glass tube 20, quartz glass tube insert 30, top 31, bottom 32, type K thermocouple 33, glass collection cup 34, ball-and-socket joints 35 and 38, and flange joints 36 and 37. Tube furnace oven 10 comprises heating elements (not shown) and spaced-apart left hemi-cylindrical wall 11 and right hemi-cylindrical wall 12. A back portion (not shown) of left hemi-cylindrical wall 11 is in hinged operative connection to a back portion (not shown) of right hemi-cylindrical wall 12 and a front portion (cut away) of left hemi-cylindrical wall 11 is in closable operative connection to a front portion (cut away) of right hemi-cylindrical wall 12, thereby establishing a means for moving left hemi-cylindrical wall 11 from an open position where the front portion (cut away) of left hemi-cylindrical wall 11 lacks operative connection to, and is swung via the aforementioned hinged operative connection (not shown) away from, the front portion (cut away) of right hemi-cylindrical wall 12 (e.g., for removing quartz glass tube 20 from tube furnace oven 10); to a closed position where the front portion (cut away) of left hemi-cylindrical wall 11 is swung via the hinged operative connection (not shown) to operative contact and in operative connection to the front portion (cut away) of right hemi-cylindrical wall 12, the closed position thereby establishing tube furnace oven 10 (e.g., for heating operation thereof). Tube furnace oven 10 defines enclosed volumetric space 15. Quartz glass tube 20 defines enclosed volumetric space 21 and is disposed in enclosed volumetric space 15 of tube furnace oven 10. Top 31 defines spaced-apart particulate inlet and outlet apertures 26 and 27. Top 31 is in sealing operative contact to quartz glass tube 20 at flange joint 37. Bottom 32 defines entraining gas inlet aperture 28, gas inlet tube 22, and probe inlet aperture 29. Bottom 32 is in sealing operative contact to quartz glass tube 20 at flange joint 36 and in sealing operative contact to glass collection cup 34 at ball-and-socket joint 35. Quartz glass tube 20 is vertically disposed within enclosed volumetric space 15 of tube furnace oven 10. Quartz glass tube insert 30 is open ended and vertically disposed in operative contact to top 31 proximal to particulate inlet aperture 26. Type K thermocouple 33 is vertically disposed within a quartz glass tube (not shown), which is vertically disposed in operative contact to bottom 32 proximal to probe inlet aperture 29. Gas inlet tube 22 is vertically disposed in operative contact to bottom 32 proximal to entraining gas inlet aperture 28. Gas inlet tube 22 is bent to provide a flow of entraining gas in a perpendicular direction to vertical axis (not indicated) of quartz glass tube 20 in order to provide a means for establishing a vortexing flow of entraining gas within enclosed volumetric space 21 of quartz glass tube 20. Each of ball-and-socket joints 35 and 38 and flange joints 36 and 37 are independently secured with metal clamps (not show), thereby establishing flow-through oven assembly 2. One or more additional thermocouples (not shown) are optional and can be used to measure temperature of, for example, enclosed volumetric space 15 of tube furnace oven 10 and temperatures of quartz glass tube 20, bottom 32, top 31, and glass conduit 70.

Powder addition funnel assembly 3 (e.g., powder addition funnel catalog number Z41837-1, Aldrich Chemical Company, St. Louis, Mo., USA) comprises particulate reservoir 80, cover 81 (optional), particulate outlet aperture 85, externally-screw threaded auger 87, and drive means receiving element 88. Drive means receiving element 88 is in rotatable operative connection to externally-screw threaded auger 87. Powder addition funnel assembly 3 proximal to particulate outlet aperture 85 is in operative connection to and fluid communication with quartz glass tube insert 30, thereby establishing fluid communication from particulate reservoir 80 sequentially past externally-screw threaded auger 87 to particulate outlet aperture 85, quartz glass tube insert 30, and enclosed volumetric space 21 of quartz glass tube 20. Cover 81 is in non-sealing operative contact to particulate reservoir 80.

Funnel assembly 4 comprises sintered glass funnel 40 and cover 45. Sintered glass funnel 40 comprises porous filter frit 41 and defines enclosed volumetric space 42 and ball-and-socket joint 48. Cover 45 defines access apertures 46 and 47. Sintered glass funnel 40 is in sealing operative contact with cover 45.

Glass conduit 70 is an open-ended tube and is in operative contact with top 31 at ball-and-socket joint 38 proximal to particulate outlet aperture 27, both of flow-through oven assembly 2, and with cover 45 proximal to access aperture 46, both of funnel assembly 4, thereby establishing fluid communication from enclosed volumetric space 21 of quartz glass tube 20 sequentially through glass conduit 70 to enclosed volumetric space 42 of funnel assembly 4 and together with the fluid communication mentioned in the preceding paragraph establishing fluid communication from particulate reservoir 80 ultimately to enclosed volumetric space 42 of funnel assembly 4, thereby establishing a particulate flow pathway (not indicated) from particulate reservoir 80 of powder addition funnel assembly 3 ultimately to enclosed volumetric space 42 of funnel assembly 4.

Entraining gas source 50 and gas line 51 are optional as discussed later. Entraining gas source 50 is in sealing operative contact to and fluid communication with gas line 51; which in turn is in sealing operative contact to bottom 32 proximal to entraining gas inlet aperture 28. Entraining gas source 50 is in sequential fluid communication with gas line 51; entraining gas inlet aperture 28 of bottom 32, gas inlet tube 22, enclosed volumetric space 21 of quartz glass tube 20, and particulate outlet aperture 27 of top 31, all of flow-through oven assembly 2; through glass conduit 70 to enclosed volumetric space 42 of funnel assembly 4, thereby establishing a first gas flow pathway (not indicated) from entraining gas source 50 ultimately to enclosed volumetric space 42 of funnel assembly 4.

Entraining gas source 55, which is optional and may be the same as or different than entraining gas source 50, is in sealing operative contact to and fluid communication with gas line 56; which in turn is in sealing operative contact to top 31 proximal to particulate inlet aperture 26. Entraining gas source 55 is in sequential fluid communication with gas line 56; particulate inlet aperture 26 of top 31, through quartz glass tube insert 30 to enclosed volumetric space 21 of quartz glass tube 20, and particulate outlet aperture 27 of top 31, all of flow-through oven assembly 2; through glass conduit 70 to enclosed volumetric space 42 of funnel assembly 4, thereby establishing a second gas flow pathway (not indicated) from entraining gas source 55 ultimately to enclosed volumetric space 42 of funnel assembly 4. As described, the first and second gas flow pathways (not indicated) partially overlap each other.

Vacuum source 60 and vacuum line 61 are optional. Vacuum source 60 is in sealing operative contact to and fluid communication with vacuum line 61, which contains adjustable valves 62 and 63. Vacuum line 61 in turn is in sealing operative contact to ball-and-socket joint 48 of funnel assembly 4, thereby establishing a reduced-pressure gas flow pathway (not indicated) from enclosed volumetric space 42 through porous filter frit 41 of funnel assembly 4 and vacuum line 61 ultimately to vacuum source 60. Examples of vacuum source 60 are a water aspirator and a wet-and-dry vacuum cleaner (e.g., SHOP-VAC® catalog number 587-24-27, Craftools, Inc., New York, N.Y., USA).

Manometer 65 and gas line 66 are optional. Manometer 65 is in sealing operative contact and fluid communication with gas line 66, which in turn is disposed in sealing operative contact with cover 45 proximal to access aperture 47, thereby establishing reduced-pressure sensing communication between manometer 65 and enclosed volumetric space 42 of sintered glass funnel 40 via gas line 66.

Assemble continuous-feed furnace assembly 1 of FIG. 1 from the previously described flow-through oven assembly 2, powder addition funnel assembly 3, funnel assembly 4, entraining gas source 50, gas line 51, entraining gas source 55, gas line 56, vacuum source 60, vacuum line 61, manometer 65, gas line 66, and glass conduit 70. Vertically dispose quartz glass tube 20 within enclosed volumetric space 15 of tube furnace oven 10 of flow-through oven assembly 2, and secure quartz glass tube 20 with, for example, a metal clamp (not shown) or bracket (not shown). Dispose and secure (e.g., via metal clamps, not shown) top 31 and bottom 32 in sealing operative contact to quartz glass tube 20 at respective flange joints 37 and 36. Insert quartz glass tube insert 30 partially through and place in sealing operative contact (e.g., friction fit) with top 31 proximal to particulate inlet aperture 26. Dispose and secure (e.g., via a metal clamp, not shown) glass collection cup 34 in sealing operative contact with bottom 32 at ball-and-socket joint 35. Dispose and secure (e.g., via a metal clamp, not shown) a portion (not indicated) of powder addition funnel assembly 3 proximal to particulate outlet aperture 85 in quartz glass tube insert 30. Dispose an auger drive means (not shown; e.g., an AC/DC gearmotor model no. 1LPZ9, Dayton, turning at 27 revolutions per minute at full speed) in rotatable operative contact to drive means receiving element 88 of powder addition funnel assembly 3. Dispose gas line 51 between and in sealing operative contact with entraining gas source 50 and bottom 32 proximal to entraining gas inlet aperture 28. Dispose gas line 56 between and in sealing operative contact with entraining gas source 55 and top 31 proximal to particulate inlet aperture 26. Dispose glass conduit 70 between and in sealing operative contact with top 31 at ball-and-socket joint 38 proximal to particulate outlet aperture 27 and cover 45 proximal to access aperture 46. Dispose cover 45 in sealing operative contact with sintered glass funnel 40 (e.g., 3 liter volume having a porous filter fit 41 having coarse porosity). Dispose vacuum line 61 between and in sealing operative contact with ball-and-socket joint 48 of sintered glass funnel 40 and vacuum source 60. Dispose gas line 66 between and in sealing operative contact with cover 45 proximal to aperture 47 and manometer 65. Assembling continuous-feed furnace assembly 1 as described here establishes the fluid communications, flow pathways (not indicated) and (sealing) operative connections described previously therefore.

Operate the continuous-feed furnace assembly 1 for thermal exfoliation of graphite oxide by first establishing a flow of entraining gas at a first flow rate (e.g., 100 standard cubic feet per hour (scfh); i.e., 2800 liters per hour (L/hour)) from entraining gas source 50 through the first entraining gas flow pathway (not indicated) to enclosed volumetric space 42 of funnel assembly 4. Also, establish a flow of entraining gas at a second flow rate (e.g., 10 scfh, i.e., 280 L/hour) from entraining gas source 55 through second entraining gas flow pathway (not indicated) to enclosed volumetric space 42 of funnel assembly 4. The first flow rate is greater than the second flow rate and both flow rates are adjustable. Establish a slight reduced-pressure gas flow from enclosed volumetric space 42 of funnel assembly 4 through the reduced-pressure gas flow pathway (not indicated) to vacuum source 60 so that manometer 65 indicates that pressure in enclosed volumetric space 42 of sintered glass funnel 40 is slightly lower than ambient pressure (e.g., lower than ambient pressure by 0.25 inches of water; i.e., 0.062 kilopascals). Adjust reduced pressure in enclosed volumetric space 42 to a desired value by incrementally opening or closing adjustable valve 63 of vacuum line 61. Turn on heating elements (not shown) of tube furnace oven 10 and heat enclosed volumetric space 15 of tube furnace oven 10 of flow-through oven assembly 2 until a stable operating temperature of from 600° C. to about 1600° C. is established in enclosed volumetric space 21 of quartz glass tube 20 as indicated by type K thermocouple 33. Charge particulate reservoir 80 with graphite oxide particles (not shown), preferably the freeze-dried isolated graphite oxide prepared according to a process of the first embodiment. Place cover 81 on top of particle reservoir 80. Activate the aforementioned auger drive means (not shown) to rotate clockwise, indicated by arrow 89, drive means receiving element 88 and, thereby rotate externally-screw threaded auger 87 so as to transport (freeze-dried) graphite oxide particles (not shown) from particulate reservoir 80 past externally-screw threaded auger 87 and down through particulate outlet aperture 85, where (freeze-dried) graphite oxide particles (not shown) fall under force of gravity and second flow of entraining gas (not shown) from entraining gas source 55 through quartz glass tube insert 30 into enclosed volumetric space 21 of quartz glass tube 20. The (freeze-dried) graphite oxide particles (not shown) are promptly thermally exfoliated starting in quartz glass tube insert 30 and continuing in enclosed volumetric space 21 of quartz glass tube 20 to give highly exfoliated graphite particles (not shown), which preferably are ultrahighly exfoliated graphite particles (not shown). Entraining gas (not shown) from entraining gas sources 50 and 55 carries (ultra)highly exfoliated graphite particles (not shown) from enclosed volumetric space 21 out particulate outlet aperture 27 of top 31. If necessary, adjust (e.g., via an adjustable valve, not shown) the first, second, or first and second flow rate(s) of entraining gas (not shown) from respective entraining gas sources 50 and 55 to obtain a desired residence time for graphite oxide particles (not shown) at the particular operating temperature being employed in enclosed volumetric space 21 of tube furnace oven 10. Residence time can be determined by, for example, high speed photography and preferably comprises from 0.02 second to 20 seconds, in some embodiments from 0.2 second to 2 seconds, e.g., 1 second. The (ultra)highly exfoliated graphite particles (not shown) that are pushed out of particulate outlet aperture 27 of quartz glass tube 20 flow through glass conduit 70 into enclosed volumetric space 42 of sintered glass funnel 40, whereupon the (ultra)highly exfoliated graphite particles (not shown) collect on top of porous filter frit 41 and, under influence of slight reduced pressure condition in enclosed volumetric space 42 due to vacuum source 60, are somewhat compressed thereon. If pressure in enclosed volumetric space 42 of sintered glass funnel 40 increases towards ambient pressure (e.g., 101 kilopascals) during collection of the (ultra)highly exfoliated graphite particles (not shown), it may be desirable to further close adjustable valve 63 to restore the desired reduced pressure condition in enclosed volumetric space 42 of funnel 40. Using the aforementioned series 3210 oven with 1100 degrees Celsius (° C.) heating elements for tube furnace oven 10, powder addition funnel catalog number Z41837-1 and a plastic cover 81 for powder addition funnel assembly 3, a 3-liter coarse sintered glass frit funnel for sintered glass funnel 40, AC/DC gearmotor model no. 1LPZ9 for auger drive means (not shown), and a wet-and-dry vacuum cleaner for vacuum source 60, and establishing a first flow rate of entraining gas from entraining gas source 50 of 2800 L/hour and a second flow rate of entraining gas from entraining gas source 55 of 280 L/hour, and an operating temperature of 1000° C. in enclosed volumetric space 21 of quartz glass tube 20, and feeding 120 grams (g) per hour of sieved graphite oxide of −25/+60 mesh size, continuous-feed furnace assembly 1 can produce 60 g of ultrahighly exfoliated graphite product per hour.

Remove (ultra)highly exfoliated graphite particles (not shown) from funnel 40 by any conventional means during or after the aforementioned thermal exfoliation operation. For example when a sufficient amount of the (ultra)highly exfoliated graphite particles (not shown) is collected as described previously, shut down operation of continuous-feed furnace assembly 1 by turning off heating elements (not shown) of tube furnace oven 10 of flow-through oven assembly 2 and allowing everything to cool to a desired recovery temperature (e.g., 25° C.). When the recovery temperature is reached, stop the first and second flows of entraining gas (not shown) and turn off vacuum source 60, and repressurize enclosed volumetric space 42 of sintered glass funnel 40 to ambient pressure by slowly opening adjustable valve 63. Disconnect glass conduit 70 from cover 45, remove cover 45, and recover the resulting collected (ultra)highly exfoliated graphite from funnel 40. Also, remove any material (e.g., unexfoliated graphite oxide) that may have fallen into glass collection cup 34 after disconnecting the latter from bottom 32 at ball-and-socket joint 35.

Variations of the configuration and construction of continuous-feed furnace assembly 1 are contemplated. For example, instead of being vertically disposed as shown in FIG. 1, flow-through oven assembly 2 may be horizontally disposed. Alternatively, flow-through oven assembly 2 is as shown in FIG. 1 except externally-screw threaded auger 87 of powder funnel assembly 3 is downwardly slanted from left to right. Flow of entraining gas through the first gas flow pathway (not indicated) may be co-current or countercurrent to incoming flow of graphite oxide particles through quartz glass tube insert 30. Countercurrent flow is what has been described previously for FIG. 1. Alternatively, entraining gas sources 50 and 55 and gas lines 51 and 56, glass conduit 70, manometer 65, gas line 66, vacuum line 61, vacuum source 60, and funnel assembly 4 are not used. Instead glass collection cup 34 is enlarged and graphite oxide particles are allowed to fall down through enclosed volumetric space 21 of quartz glass tube 20 under force of gravity so that (ultra) highly exfoliated graphite particles are collected in glass collection cup 34.

Variations of the operation of continuous-feed furnace assembly 1 are contemplated. For example, instead of shutting down thermal exfoliation operation of continuous-feed furnace assembly 1 after the sufficient amount of the (ultra) highly exfoliated graphite particles (not shown) is collected as described in the previous paragraph, remove the collected (ultra)highly exfoliated graphite particles (not shown) from enclosed volumetric space 42 of sintered glass funnel 40 during continuous operation of continuous-feed furnace assembly 1. The collected (ultra)highly exfoliated graphite particles (not shown) can be removed periodically or continuously by conventional means such as, for instance, by replacing manometer 65 with a snorkel (not shown) operatively connected to another vacuum source (not shown) having a collection means (e.g., bag house filter) to suction the (ultra) highly exfoliated graphite particles (not shown) into a container (not shown) while still collecting additional (ultra) highly exfoliated graphite particles (not shown). Then replace the snorkel (not shown) with manometer 65 and continue collecting further additional (ultra)highly exfoliated graphite particles (not shown). Alternatively, cover 45 of funnel assembly 4 may further define a third aperture (not shown) and the snorkel may be in sealing operative contact to cover 45 proximal to the third aperture (not shown). In theory, the continuous-feed furnace assembly 1 can be operated perpetually until it is in need of cleaning or maintenance provided that graphite oxide is kept charged (periodically or continuously as from a spray dryer source of graphite oxide) in particulate reservoir 80 of powder addition funnel assembly 3 and (ultra)highly exfoliated graphite particles (not shown) are periodically or continuously removed from funnel 40 of funnel assembly 4.

For purposes of United States patent practice and other patent practices allowing incorporation of subject matter by reference, the entire contents—unless otherwise indicated—of each U.S. patent, U.S. patent application, U.S. patent application publication, PCT international patent application and WO publication equivalent thereof, referenced in the instant Detailed Description of the Invention are hereby incorporated by reference. In an event where there is a conflict between what is written in the present specification and what is written in a patent, patent application, or patent application publication, or a portion thereof that is incorporated by reference, what is written in the present specification controls.

In the present application, any lower limit of a range of numbers, or any preferred lower limit of the range, may be combined with any upper limit of the range, or any preferred upper limit of the range, to define a preferred aspect or embodiment of the range. Each range of numbers includes all numbers, both rational and irrational numbers, subsumed within that range (e.g., the range from about 1 to about 5 includes, for example, 1, 1.5, 2, 2.75, 3, 3.80, 4, and 5).

In an event where there is a conflict between a compound name and its structure, the structure controls.

In an event where there is a conflict between a unit value that is recited without parentheses, e.g., 2 inches, and a corresponding unit value that is parenthetically recited, e.g., (5 centimeters), the unit value recited without parentheses controls.

As used herein, "a," "an," "the," "at least one," and "one or more" are used interchangeably. In any aspect or embodiment of the instant invention described herein, the term "about" in a phrase referring to a numerical value may be deleted from the phrase to give another aspect or embodiment of the instant invention. In the former aspects or embodiments employing the term "about," meaning of "about" can be construed from context of its use. Preferably, "about" means from 90 percent to 100 percent of the numerical value, from 100 percent to 110 percent of the numerical value, or from 90 percent to 110 percent of the numerical value. In any aspect or embodiment of the instant invention described herein, the open-ended terms "comprising," "comprises," and the like (which are synonymous with "including," "having," and "characterized by") may be replaced by the respective partially closed phrases "consisting essentially of," consists essentially of," and the like or the respective closed phrases "consisting of," "consists of," and the like to give another aspect or embodiment of the instant invention. In the present application, when referring to a preceding list of elements (e.g., ingredients), the phrases "mixture thereof," "combination thereof," and the like mean any two or more, including all, of the listed elements. The term "or" used in a listing of members, unless stated otherwise, refers to the listed members individually as well as in any combination, and supports additional embodiments reciting any one of the individual members (e.g., in an embodiment reciting the phrase "10 percent or more," the "or" supports another embodiment reciting "10 percent" and still another embodiment reciting "more than 10 percent."). The term "plurality" means two or more, wherein each plurality is independently selected unless indicated otherwise.

The terms "Brunauer-Emmett-Teller surface area" and "BET surface area" are synonymous and means a value that is measured using a method in which 30% nitrogen in helium, at a $P/P_0$ ratio of 0.3, is adsorbed onto a test sample at liquid nitrogen temperature. In the method, use a Quantachrome Monosorb BET surface area analyzer (Quantachrome Instruments, Boynton Beach, Fla., USA) having a measurement position to make the measurements. Load a test sample (e.g., an exfoliated graphite such as highly exfoliated graphite) into a tared cuvette and degas the test sample for 10 minutes at 200° C. and atmospheric pressure. Place the cuvette in the measurement position of the analyzer and allow it to purge for 10 minutes. Allow nitrogen/helium gas to absorb at liquid nitrogen temperature and then desorb at room temperature to give desorption signals. Record signal readings in square meters ($m^2$). Remove sample from the analyzer and determine its final sample mass. Divide integrated desorption signal by the final sample mass to obtain the BET surface area in square meters per gram. Repeat with two additional test samples. Average the BET surface area of the 3 runs to determine the final BET surface area.

The term "enclosed volumetric space" means a 3-dimensional area largely bounded by element or elements which define the 3-dimensional area. The element(s) preferably further define one or more apertures that allow fluid communication between the 3-dimensional area and another 3-dimensional area disposed exterior to the element(s).

The term "entraining gas" means a gaseous or vaporous substance such as nitrogen gas, argon gas, helium gas, or a reducing gas (e.g., hydrogen gas). The reducing gas is useful for controlling residual oxygen content of the isolated exfoliated graphite produced in the process of the third embodiment.

The terms "exfoliate," "exfoliated," "exfoliation" and the like mean partially delaminated, fully delaminated and, preferably, mixtures thereof. Degree of exfoliation may be characterized by determining a number average layer stacking of an exfoliated material comprising a plurality of layered-stacking particles.

The term "fluid" means a liquid or, preferably, gaseous substance or a flowable particulate suspension therein.

Particle size analysis methods and instruments are well known to the skilled person in the art. Preferably, particle size is determined using a Microtrac S3500 Particle Size Analyzer (Advanced Research Tools Corporation, Downers Grove, Ill., USA) for dispersions of graphite oxide and (exfoliated) graphite in 2-propanol. The particle size distribution is not critical and in some embodiments is characterized as being monodispersed, bimodal, or polymodal Unless otherwise noted, the phrase "Periodic Table of the Elements" refers to the official periodic table, version dated Jun. 22, 2007, published by the International Union of Pure and Applied Chemistry (IUPAC). Also any references to a Group or Groups shall be to the Group or Groups reflected in this Periodic Table of the Elements.

The term "operative contact" means direct or indirect touching of two elements (e.g., 10 and 14 in FIG. 1), wherein the elements may or may not also be in operative connection with each other. Form of the operative contact is not critical as long as it provides satisfactory touching of the two elements (e.g., maintains the two elements in same positions relative to each other, other than perhaps, for example, rotation of one element relative to the other element or some flexing of the elements toward and away from each other in response to a motive force). Suitable forms of operative contact are known in the art. Examples of operative contact without operative connection are a close tolerance fit and a friction fit. The close tolerance fit may or may not employ a lubricant or grease between the two elements. An example of a useful lubricant is a silicone-based vacuum grease.

The term "operative connection" means direct or indirect secure joining of two elements to each other via any one or more of a variety of securing means. Choice of the securing means is not critical as long as it provides satisfactory operative connection (e.g., maintains the two elements in same positions relative to each other, other than perhaps some flexing of the elements toward and away from each other in response to a motive force). Suitable securing means are known in the art. Examples of suitable securing means are adhesives, clamps, fastening means such as pins, screws, rivets, dowel pins, and other mechanical fasteners, and a snap fit.

The term "sealing" means to secure against leakage, especially leakage of a fluid, particulate solid, or both. Suitable ways of securing against leakage are known in the art. Securing against leakage may be accomplished, for example, with a close tolerance dry fit, or may employ a sealing means. Examples of suitable sealing means are a gasket, o-ring, rubber dam, and substantially insoluble (in the fluid) substance (e.g., silicone-based grease).

The continuous-feed furnace assembly of the second embodiment can be constructed from one or more materials known to be useful in the art. Examples are metals (e.g., titanium), metal alloys (e.g., steel, stainless steel, and HASTELLOY® (Haynes International, Inc.) alloys), glass (e.g., a borosilicate glass), insulating materials, and combinations thereof. Polytetrafluoroethylene is also contemplated as a material (e.g., a conduit instead of glass conduit 70).

The continuous-feed furnace assembly may further comprise one or more other components. Examples of such components are a temperature controller; a means for controlling feed rate of graphite oxide into the flow-through oven (e.g., 3); a means for automatically shutting down operation of the continuous-feed furnace assembly in response to one or more changes in oven temperature, feed rate of graphite oxide, feed rate of the entraining gas, pressure changes, and the like; and a means for post-treating the isolated exfoliated graphite produced in the process of the third embodiment ("post-treatment means"). The post-treatment means being, for example, a means for compressing (e.g., 60), a means for particle size reduction or enlargement, a means for washing, a means for oxidizing or reducing, a means for plasma-treating, or a means for functionalizing (e.g., with a functional group such as carboxy) the isolated exfoliated graphite. Examples of other components that may further comprise the continuous-feed furnace assembly are gauges (e.g., pressure or temperature gauges or both), adjustable valves, portions for making operative connections (e.g., brackets and clamps), electronic components (e.g., electrical switches and lights), cooling elements, additional heating elements, a particle flow-modifying device (e.g., baffles), and sampling apertures.

The present invention contemplates any suitable flow-through oven (e.g., 10) provided it is capable of heating the enclosed volumetric space thereof (e.g., 15) to the aforementioned operating temperature of from 600° C. to 1600° C., preferably 600° C. to 1500° C., more preferably from 800° C. to 1200° C.

The present invention contemplates any suitable means for continuously adding a particulate precursor material (e.g., 3 in FIG. 1). Preferably, the means for continuously adding a particulate precursor material (e.g., 3) comprises a powder addition funnel (e.g., 3) or vibratory feeder (e.g., such as are commercially available from Vibratory Feeders Inc., Colchester, Conn., USA and Schenck-AccuRate Tuf-Flex™ Volumetric Feeder, Schenck-AccuRate, Inc., Whitewater, Wis., USA).

The present invention contemplates any suitable means for collecting a particulate product material (e.g., 40 in FIG. 1). Preferably, the means for collecting a particulate product material (e.g., 40) comprises a filter (e.g., sintered glass filter (e.g., 40), a bag house filter, a cyclone filter, or a mesh screen); a liquid sprayer (e.g., one or more nozzles creating an atomizing spray of a collecting liquid (e.g., water), which contacts the removed exfoliated graphite, causing it to be collected; an electrostatic precipitator, which employs an electrical field between an electrode and a ground or antipode and a collecting means (e.g., moving stainless steel belt) disposed therebetween, on which collecting means is collected the removed exfoliated graphite; or a centrifuge.

The term "chlorate salt" means an inorganic ionic substance comprising an anion $ClO_3^-$ and one or more inorganic cations, wherein the inorganic cations are selected such that the substance is, in aggregate, neutral. Preferably, the chlorate salt comprises potassium chlorate, lithium chlorate, calcium chlorate, magnesium chlorate, barium chlorate, or sodium chlorate, more preferably solid potassium chlorate, and still more preferably aqueous sodium chlorate. In some embodiments, the chlorate salt is in a form of a solid powder. In other embodiments, the chlorate salt comprises an aqueous solution of the chlorate salt, preferably at a concentration of at least 0.1 moles of sodium chlorate per liter of aqueous sodium chlorate, i.e., 0.1 molar (M).

The term "graphite" means a solid particle consisting essentially of crystalline carbon with a characteristic crystal structure as determined by X-ray diffraction. A graphite particle comprises a layer stacking of a plurality of planar sheets consisting essentially of carbon atoms. The term "graphite" is sometimes used in the art to refer to a plurality of graphite particles. Preferably, graphite is in powder form or flake form or mixtures thereof. Examples of suitable starting graphites are commercially available under the trade names Asbury 3775 (Asbury Graphite Mills Inc.) and TIMREX® GA96/10 (Timcal Graphite and Carbon, Inc.).

Preferably, the graphite consists essentially of particles having sizes characterized as being −10 mesh or a higher mesh number (e.g., −100 mesh graphite). A −10 mesh graphite means graphite that can pass through a −10 mesh screen. More preferably, the graphite consists essentially of particles having sizes characterized as being about −100 mesh or a higher mesh number, still more preferably about −300 mesh or a higher mesh number. Even more preferred is about −325 mesh graphite (i.e., particles will be about 44 micrometers (μm) or smaller). Particle size and mesh number are inversely related. Although fine graphite is preferable, coarse graphite may also be used.

Separation of the pluralities of planar sheets of graphite particles into a mixture of smaller stacks comprising exfoliated graphite or smaller stacks comprising exfoliated graphite and graphene is accomplished by exfoliating (i.e., partial delamination or partial delamination and complete delamination) the graphite. "Graphene" is a one-atom-thick planar sheet (i.e., platelet) consisting essentially of carbon atoms and has a theoretical Brunauer-Emmett-Teller (BET) surface area of about 2630 square meters per gram ($m^2/g$). The term "graphene" is sometimes used in the art to refer to a plurality of graphene particles or highly exfoliated graphite.

The term "exfoliated graphite" means any carbon material derived by exfoliating a graphite oxide or a graphite intercalation compound and having a BET surface area of 15 $m^2/g$ or higher. Examples of suitable graphite intercalation compounds are commercially available under the trade names GRAFGuard® 160-50N (from GRAFTech Inc., Advanced Energy Technologies Division, Parma, Ohio) and HP-50 (from HP Material Solutions, Northridge, Calif.). A particular exfoliated graphite may be categorized for present purposes as being either a conventional exfoliated graphite, which as previously mentioned is characterized as having a BET surface area of from about 15 $m^2/g$ to about 150 $m^2/g$, or a highly exfoliated graphite. The term "highly exfoliated graphite" means exfoliated graphite having a BET surface area of more than 200 $m^2/g$, preferably more than 400 $m^2/g$, and typically from 400 $m^2/g$ to 1500 $m^2/g$. Preferably, the highly exfoliated graphite has a BET surface area of 500 $m^2/g$ or higher, more preferably more than 700 $m^2/g$, still more preferably 800 $m^2/g$ or higher, even more preferably 900 $m^2/g$ or higher. Highly exfoliated graphite having a BET surface area of 900 m²/g or higher is sometimes referred to herein as ultrahighly exfoliated graphite. While higher BET surface areas are usually preferred, in some embodiments of the present invention, the highly exfoliated graphite has a BET surface area of 1400 m²/g or lower, in other embodiments, 1300 m²/g or lower, and in still other embodiments 1200 m²/g or lower.

The terms "graphite oxide" and "intercalated graphite oxide" are synonymous and mean a material comprising carbon atoms and oxygen atoms, the material being derived by oxidizing a graphite and wherein most, if not all, of the oxygen atoms are covalently bonded to some of the carbon atoms. The term "graphite oxide" is sometimes used in the art to refer to a plurality of graphite oxide particles. Preferably, graphite oxide consists essentially of the elements carbon and oxygen. In some embodiments, the graphite oxide (e.g., collected graphite oxide) further consists essentially of relatively small amounts (e.g., less than 5 weight percent (wt %)) of inorganic impurities.

The term "inorganic source of nitrate anion" means a nitric acid, an inorganic nitrate salt, or a mixture thereof. The term "inorganic nitrate salt" means an ionic substance lacking carbon atoms and comprising an anion $NO_3^-$ and one or more inorganic cations, wherein the inorganic cations are selected such that the substance is, in aggregate, neutral. In some embodiments, the inorganic source of nitrate anion is a nitric acid. In some embodiments, the inorganic source of nitrate anion is an inorganic nitrate salt. In some embodiments, the inorganic source of nitrate anion is a mixture of the nitric acid and the inorganic nitrate salt.

The term "nitric acid" means fuming $HNO_3$, concentrated $HNO_3$, or a mixture thereof. The "concentrated nitric acid" means a concentrated nitric mixture that formally consists essentially of $HNO_3$ and water, wherein the $HNO_3$ is at least 65 wt %, but 86 wt % or less, of the concentrated nitric acid mixture based on total weight of the concentrated nitric acid mixture. A "fuming nitric acid" means a fuming nitric mixture that contains more than 86 wt % of $HNO_3$, water, and optionally nitrogen dioxide ($NO_2$), based on total weight of the fuming nitric mixture. In some embodiments, the nitric acid used in the oxidation of graphite is the concentrated nitric acid.

Preferably, the inorganic nitrate salt comprises ammonium nitrate (i.e., solid or aqueous $NH_4NO_3$) or a metal nitrate salt of the formula $M(NO_3)_y$, wherein M is a metal of any one of Groups 1, 2, and 3 of the Periodic Table of the Elements, the metal being in a formal oxidation state of +1, +2, or +3, respectively, and y is an integer of 1, 2, or 3 and is selected such that $M(NO_3)_y$ is, in aggregate, neutral. More preferably, the inorganic nitrate is aluminum nitrate, ammonium nitrate, sodium nitrate, potassium nitrate, lithium nitrate, calcium nitrate, magnesium nitrate, or barium nitrate. The inorganic nitrate salt is in solid form, in a form of an aqueous solution, or a combination thereof (e.g., a solid suspension in aqueous solution). Where the inorganic nitrate salt and chlorate salt are each in solid form, then the reaction mixture employed in the process of the first embodiment further comprises an amount of water, which amount is sufficient to allow production of graphite oxide. Preferably, the amount of water is what would have otherwise been used to prepare the corresponding aqueous solution of the inorganic nitrate salt had the latter been employed instead of the solid inorganic nitrate salt. Preferably the inorganic nitrate salt is the form of an aqueous solution, and more preferably the aqueous solution is at a concentration of at least 0.1 moles of inorganic nitrate salt per liter of aqueous inorganic nitrate salt, i.e., 0.1 molar (M).

The term "purified water" means a substance having the molecular formula $H_2O$, wherein H is hydrogen and O is oxygen, that has been physically processed to remove impurities, preferably substantially all (i.e., greater than 99 weight percent of) impurities. Respective examples of such purified water are distilled water, deionized water, osmotically-processed water, filtered water, ultraviolet light oxidization-processed water, electrodialized water, and a combination of any two or more thereof. Preferably, the purified water comprises deionized water or distilled water.

The term "sulfuric acid" means fuming $H_2SO_4$, concentrated $H_2SO_4$, or a mixture thereof. A "concentrated sulfuric acid" means a concentrated sulfuric mixture that formally consists essentially of $H_2SO_4$ and water, wherein the $H_2SO_4$ is at least 90 wt % of the concentrated sulfuric mixture based on total weight of the concentrated sulfuric mixture. A "fuming sulfuric acid" means a fuming sulfuric mixture that formally consists essentially of sulfur trioxide ($SO_3$), $H_2SO_4$, and water, wherein preferably the $SO_3$ is up to 30 wt % of the fuming sulfuric mixture. In some embodiments, the sulfuric acid used in the oxidation of graphite is the concentrated sulfuric acid.

The starting materials comprising the reaction mixture (i.e., a sulfuric acid, a nitric acid, water, a graphite, and a chlorate salt) are commercially available from a variety of vendors. The present invention also contemplates using one or more starting materials that are not obtained from a commercial vendor. A preferred process is mentioned in WO 2007/047084 and a more preferred process is described in WO 2009/018204.

In some embodiments, the present invention contemplates using different concentrations of the graphite in the reaction mixture. In such embodiments, concentration of graphite in the reaction mixture is preferably at least about 2 wt %.

In some embodiments, the present invention contemplates using different concentrations of the sulfuric acid in the reaction mixture. In such embodiments, concentration of sulfuric acid in the reaction mixture can vary, but is preferably at least about 50 wt %.

In some embodiments, the present invention contemplates running reactions at different temperatures of the reaction mixture. In such embodiments, the reaction is preferably run at a temperature of the reaction mixture of 0° C. or higher. Also preferably, temperature of the reaction mixture is maintained at about 55° C. or lower. When the chlorate salt is solid sodium chlorate, preferably temperature of the reaction mixture is 40° C. or higher and 100° C. or lower, more preferably about 55° C. or lower.

There is no particular limitation on reaction time, i.e., how long the Staudenmaier reaction should be allowed to run starting when addition of the chlorate salt begins. Preferably, the reaction is quenched within 30 hours of reaction time, more preferably within 24 hours of reaction time, and still more preferably within 6 hours of reaction time. In many cases, extensive oxidation has already taken place within the first 4 hours of the reaction time. Preferably after a suitable reaction time under the circumstances has been realized, the reaction is quenched, for example, by adding the reaction mixture to an excess of purified water (e.g., deionized water), with stirring. The resulting graphite oxide product may then be separated from the reaction mixture by, for example, filtration, centrifugation, or decantation, with filtration being preferred. The resulting collected graphite oxide will contain residual water and, perhaps inorganic impurities (e.g., residual sulfuric acid, sulfate salts, nitrate salts, reaction by-products, or a combination of any two or more thereof). The collected graphite oxide optionally may be washed with additional purified water, e.g., to remove some, most, or all of the inorganic impurities. The collected graphite oxide, whether washed or not, preferably is then dried, for example, oven drying at between about 60° C. and 80° C. overnight or, more preferably, freeze drying, still more preferably freeze-drying at a temperature of 30° C. or less to give a dried isolated graphite oxide (e.g., oven-dried or freeze-dried isolated graphite oxide). Also preferably, the isolated graphite oxide is ground and sieved to produce subgroupings of the isolated graphite oxide according to particle size. Different subgroupings may be optimal for use with different continuous-feed furnace assemblies according to configuration and dimensions thereof. In some embodiments, the oven-dried isolated graphite oxide is thermally exfoliated to give highly exfoliated graphite having BET surface areas of from 400 m$^2$/g to 800 m$^2$/g. In some embodiments, the freeze-dried isolated graphite oxide is thermally exfoliated to give an ultrahighly exfoliated graphite having a BET surface area of from 900 m$^2$/g to 1500 m$^2$/g.

The present invention contemplates forming the reaction mixture in a variety of ways. In some embodiments, the process of the first embodiment is a continuous process (i.e., uninterrupted input of starting materials producing a flowing reaction mixture) or, more preferably, a batch process (i.e., input of fixed quantities of starting materials producing a separate unique reaction mixture). The batch process includes laboratory and manufacturing scale processes.

In a typical batch process according to the present invention, the sulfuric acid and inorganic source of nitrate anion are preferably first mixed together before addition of the other starting materials. The amount of water is also added where the inorganic source of nitrate anion is a solid inorganic nitrate salt. The amounts of sulfuric acid, inorganic source of nitrate anion, and water, if any, are as discussed above. Following mixing of the sulfuric acid, inorganic source of nitrate anion, and water, if any, sufficient time is allowed for the formation of the nitronium ion, for instance from 3 minutes to 4 hours. Then, the graphite is added to the sulfuric acid/inorganic source of nitrate anion mixture, preferably with stirring until the graphite is essentially uniformly distributed to give a sulfuric acid/graphite mixture/inorganic source of nitrate anion mixture. This allows the formation of the graphite-nitronium intermediate. The chlorate salt is then added, either in portions or all at once, to the sulfuric acid/inorganic source of nitrate anion/graphite mixture, with addition in portions being preferred. Following addition of the chlorate salt, the resulting reaction mixture is allowed to stir until the desired amount of graphite oxide is formed.

In some embodiments, mixing of sulfuric acid and an inorganic source of nitrate anion results in formation of nitronium ion ($NO_2^+$) or mixing of sulfuric acid, an inorganic source of nitrate anion, and graphite results in formation of a nitronium ion-graphite complex or both nitronium ion-graphite complex and nitronium ion ($NO_2^+$). Preferably, the presence of the starting materials, nitronium ion, or a nitronium ion-graphite complex is monitored in the reaction mixture during the reaction (i.e., in real-time), more preferably monitored by Raman spectroscopy, especially as described in WO 2009/018204A1, page 10, at line 22, to page 15, at line 17; and page 16, line 22, to page 17, line 3.

In preferred embodiments of the present invention, the amounts of the starting materials are selected such that the concentration of excess nitronium ion in the reaction mixture is essentially minimized throughout the reaction. The concentration of nitronium is essentially minimized through the monitoring of the reaction by the use of appropriate amounts of starting materials and timing of their additions as described above. By essentially minimizing the concentration of excess nitronium, it has been found that an isolated graphite oxide useful for producing an exfoliated graphite having a higher BET surface area can be obtained.

The present invention contemplates employing any graphite oxide in the process of the third embodiment. Preferably, the graphite oxide employed therein is a dried graphite oxide, which preferably contains less than 5 wt %, more preferably less than 2 wt %, and still more preferably less than 1 wt % water. The present invention contemplates any means for drying (i.e., removing water from) graphite oxide to produce the dried graphite oxide. Examples of suitable means for drying graphite oxide are induction heating, microwave heating, freeze-drying, and more preferably freeze-drying according to the process of the first embodiment.

The present invention contemplates forming highly exfoliated graphite from the graphite oxide by any of a variety of processes, including solution processes, sonication, or thermal processes. Preferred is thermal exfoliation at a temperature of from about 250° C. to about 2000° C., more preferably at a temperature of from about 500° C. to about 1600° C., still more preferably at a temperature of about 1000° C. Thermal exfoliation is done under a substantially inert atmosphere, e.g., under an atmosphere consisting essentially of nitrogen, helium, argon, or a mixture thereof. A typical procedure is described later. Prior to use, the highly exfoliated graphite (typically fluffy black) may be homogenized in a blender or other homogenizer. Optionally, the highly exfoliated graphite may also be compacted lightly by applying moderate pressure to an amount thereof placed in a deformable space or container such as a vacuum bag or a metal die, respectively.

In some embodiments, the continuously feeding step (c) of the process of the third embodiment comprises a gravity drop of the graphite oxide down through the flow-through oven and onto the means for collecting a particulate product material. Preferably, the process of the third embodiment further comprises a step of providing a source of an entraining gas, wherein the flow-through oven further defines a gas inlet aperture, the gas inlet aperture being spaced apart from the particulate outlet aperture, the source of the entraining gas being in sequential fluid communication with the gas inlet aperture, enclosed volumetric space, and particulate outlet aperture of the flow-through oven and the means for collecting a particulate product material, thereby establishing a gas flow pathway; and the continuously removing step (c) comprises flowing an entraining gas from the source thereof sequentially through the gas inlet aperture, enclosed volumetric space, and particulate outlet aperture of the flow-through oven and to the means for collecting a particulate product material, thereby establishing a flow of the entraining gas through the gas flow pathway. In some embodiments, the flow of the entraining gas is constant. In some embodiments, the flow of the entraining gas is varied (e.g., pulsed).

General Methods

Staudenmaier Synthesis of Graphite Oxide

Prepare graphite oxide according to the method of Staudenmaier (Staudenmaier, L., *Ber. Dtsh. Chem. Ges.*, 1898, 31, 1484) using 11 grams (g) of solid potassium chlorate ($KClO_3$) salt; 1 g graphite (−325 mesh; natural flake, obtained from Alfa Aesar catalog number 43209, Alfa Aesar, Ward Hill, Mass., USA); 17.9 milliliters (mL) of concentrated (98 wt %) $H_2SO_4$; and 9.5 mL of concentrated (70 wt %) nitric acid (0.15 mol $HNO_3$). Use ice bath and stirring to keep temperature of the resulting stirred reaction mixture between 0° C. and 5° C. over 24 hours. Quench the reaction mixture after 24 hours by adding it to deionized water, centrifuge or filter (as noted later in Table 1), and wash the resulting graphite oxide cake with additional deionized water (as noted later in Table 1). Divide the resulting washed graphite oxide cake into separate first and second portions: the first portion is oven-dried as described below in Comparative Example 1 and the second portion is freeze-dried as described below in Example 1a.

COMPARATIVE EXAMPLES
(NON-INVENTION)

Comparative Example 1

Oven Drying of Graphite Oxide

Transfer the first portion of graphite oxide cake prepared as described above in the Staudenmaier synthesis of graphite oxide to a glass dish and dry in an oven at 80° C. to a constant weight to give the oven-dried graphite oxide of Comparative Example 1. Divide into multiple portions.

Comparative Examples 2 to 4

Thermal Exfoliation of Oven-Dried Graphite Oxide to Give Highly Exfoliated Graphite Batch mode thermal exfoliation of oven-dried graphite oxide employing a horizontally-disposed tube furnace. Add a from 0.1 g to 0.3 g portion of the oven-dried graphite oxide of Comparative Example 1 to a quartz boat equipped with a quartz loop on an end and covered with a tight-fitting, fine-mesh stainless steel screen. Conduct the following under a high purity anhydrous nitrogen gas atmosphere/purge at a flow rate of 2 liters per minute. Preheat the horizontally-disposed tube furnace fitted with a quartz pyrolysis tube to 900° C. (Comparative Examples 2 and 3) or 1000° C. (Comparative Example 4). Preheat the quartz boat and a portion of the fine graphite oxide powder at entrance of the quartz pyrolysis tube for 1 minute to remove air and moisture from the fine powder, and then insert the quartz boat and the portion of preheated fine graphite oxide powder into the center of the quartz pyrolysis tube for heating for 30 seconds at 900° C. or 1000° C., respectively. Draw the quartz boat back and allow the resulting material to cool for 1 minute at the entrance of the furnace tube, and then remove it completely from the tube and allow it to cool to room temperature to give the highly exfoliated graphite of Comparative Examples 2 to 4, respectively. Use portions of same to determine its BET surface areas according to the method described previously and, for Comparative Examples 2 and 3, median particle sizes. The BET surface areas and median particle sizes are reported later in Table 1.

A drawback of the batch mode thermal exfoliation method described in the preceding paragraph is productivity per hour of the horizontally-disposed tube furnace is limited by a combination of graphite oxide holding capacity and heating and cooling times of a quartz boat. The quartz boat has to be loaded at room temperature with graphite oxide, heated to the setpoint temperature, and then cooled back to room temperature to unload the highly exfoliated graphite product. The higher the graphite oxide holding capacity of a quartz boat, the longer are heating and cooling times of the quartz boat. For example using a typical laboratory scale sized version of the horizontally-disposed tube furnace, a quartz boat holds up to about 8 g of graphite oxide. The entire heating and cooling cycle of the quartz boat takes about 1 hour and typically yields about 3.5 g of the highly exfoliated graphite product, giving a batch mode productivity for the laboratory scale sized horizontally-disposed tube furnace of about 3.5 g of highly exfoliated graphite per hour. Another drawback of the batch mode of thermal exfoliation relates to its slow and non-uniform heating rate of the graphite oxide. As the quantity of the graphite oxide increases, the batch mode heating rate slows and also varies with position within the bed of graphite oxide particles. At large scale quantities, the batch mode heating rate slows to a deleterious extent so as to degrade the quality of the resulting exfoliated graphite product produced thereby. In addition, the thermal history of individual particles varies with position in the graphite oxide bed, potentially causing variability in product properties.

Comparative Example 5

Preparation of poly(ethylene-co-vinyl acetate)-Highly Exfoliated Graphite Composite Suspend a 110 milligram (mg) portion of the ultrahighly exfoliated graphite of Comparative Example 4 in toluene (100 g), sonicate the suspension in a sonic bath for 20 hours, and withdraw an aliquot of the sonicated suspension for particle size analysis. To the remainder of the sonicated suspension, add 15.2 g of a 12.5 wt % solution of ELVAX™4987 (E. I. DuPont de Nemours and Company, Wilmington, Del., USA) (i.e., poly(ethylene-co-vinyl acetate), and sonicate the resulting mixture for 30 minutes. Rotary evaporate the mixture to dryness (constant weight), and dry the residual solids in a vacuum oven at 80° C. overnight. Using a heated mold, press the resulting dried product into a rectangular disk at 180° C. to give poly(ethylene-co-vinyl acetate)-ultrahighly exfoliated graphite composite of Comparative Example 5. Characterize the poly(ethylene-co-vinyl acetate)-highly exfoliated graphite composite of Comparative Example 5 by resistivity as follows. Measure thickness, width, and length of disk in centimeters. Score and cold-fracture the disk. Paint the resulting fractured edges with conductive silver and measure electrical resistance using an ohmmeter and expressed in units of ohms Calculate resistivity using the following formula: resistivity=electrical resistance times disk thickness times (disk width divided by disk length), where all spatial dimensions are in centimeters. Resistivity of the poly(ethylene-co-vinyl acetate)-ultrahighly exfoliated graphite composite of Comparative Example 5 is 72 ohm-centimeters.

EXAMPLES OF THE PRESENT INVENTION

Non-limiting examples of the present invention are described below.

Example 1a

Freeze Drying of Graphite Oxide

Dilute the second portion of washed graphite oxide cake prepared as described above in the Staudenmaier synthesis of graphite oxide to about 400 mL with deionized water and stir to form a homogeneously dispersed brown suspension of colloidal graphite oxide particles. Draw a portion of the 400 mL suspension into a 60 mL volumetric syringe, and inject the drawn portion into a vessel containing stirred liquid nitrogen to give frozen aqueous graphite oxide suspension in liquid nitrogen. Repeat the drawing and injecting several times until all 400 mL of the 400 mL suspension is frozen and suspended in liquid nitrogen. Pour the frozen aqueous graphite oxide suspension and liquid nitrogen through a 40 mesh stainless steel sieve pan to separate the frozen aqueous graphite oxide suspension from the liquid nitrogen. Distribute portions of the separated frozen aqueous graphite oxide suspension into several tall glass vessels (e.g., fleakers), and cover openings in the tall glass vessels with porous paper disk. Insert a bimetal dial thermometer into the frozen aqueous graphite oxide suspension, load the tall glass vessels containing frozen aqueous graphite oxide suspension into a freeze-drying chamber, and evacuate the chamber to commence sublimation of water from the frozen contents of the tall glass vessels. During the freeze-drying process, temperature of the frozen contents containing the graphite oxide always remains between −20° C. and −30° C. After 1 week, the tall glass vessels contains freeze-dried isolated graphite oxide of Example 1a at ambient temperature. Remove the freeze-dried isolated graphite oxide product and store it for further use.

Example 1b

Thermal Exfoliation of Freeze-dried Isolated Graphite Oxide to Give Ultrahighly Exfoliated Graphite Follow the procedure of Comparative Example 2 except use the freeze-dried isolated graphite oxide of Example 1a instead of the oven-dried graphite oxide of Comparative Example 1 to give the ultrahighly exfoliated graphite of Example 1b. Use portions to determine its BET surface area according to the method described previously and median particle size. The BET surface area and median particle size are reported later in Table 1.

Examples 2 to 7

Thermal Exfoliation of Freeze-dried Isolated Graphite Oxide to Give Ultrahighly Exfoliated Graphite Repeat the Staudenmaier synthesis of graphite oxide as described previously except using the graphite oxide cake washing procedure as described later in Table 1 to respectively give second portions of washed graphite oxide. Freeze dry the respective second portions of washed graphite oxide according to the procedure described in Example 1a to respectively give freeze-dried isolated graphite oxides. Thermally exfoliate the respective freeze-dried isolated graphite oxides according to the procedure of Example 1b to respectively give the ultrahighly exfoliated graphite of Examples 2 to 7. Use portions of the ultrahighly exfoliated graphite of Examples 2 to 7 to determine their BET surface areas according to the method described previously. The BET surface areas and median particle sizes are reported later in Table 1.

Examples 8a to 8e

Continuous-Feed Thermal Exfoliation of Oven-Dried Graphite Oxide

Grind a portion of the oven-dried graphite oxide of Comparative Example 1 in a blender, and sieve the ground portion through a stack of 8-inch (20-centimeter) stainless steel sieve screens. Collect sieved graphite oxide subportions having the following U.S. mesh sizes ((relevant subportion number) mesh size): (8a)+25 mesh; (8b)−25/+60 mesh; (8c)−60/+80 mesh; (8d)−80/+120 mesh; and (8e)−120 mesh, wherein a "+" indicates particles retained by the sieve and a "−" indicates particles that pass through the sieve. Using continuous-feed furnace assembly 1 of FIG. 1, dispose a glass collection cup 34 within bottom 32 to collect any unexfoliated graphite oxide. Heat tube furnace oven 10 to 1000° C., and set flow rate of entraining nitrogen gas from entraining gas source 50 at from 0.5 liters per minute to 0.4 liters per minute. Conduit 70 comprises polytetrafluoroethylene tubing. Vacuum source 60 comprises a water aspirator. In separate experiments, charge particulate reservoir 80 with one of the sieved graphite oxide subportions 8a to 8e, and initiate continuous feeding thereof so that the sieved graphite oxide falls into enclosed volumetric space 21 of quartz glass tube 20 of tube furnace oven 10 of flow-through oven assembly 2, and collect respective ultrahighly exfoliated graphite products 8a to 8e on porous filter frit 41 of funnel assembly 4; mass yields 40%. After the reaction flow is complete, use a portion of each of the collected ultrahighly exfoliated graphite products to determine its BET surface area. As reported later in Table 1, BET surface areas of the ultrahighly exfoliated graphite products prepared from sieved graphite oxide subportions 8a to 8e ranged from 827 m²/g to 953 m²/g. Best operational behavior (e.g., density and residence time in enclosed volumetric space 21 of quartz glass tube 20 of sieved graphite oxide) is observed for the sieved graphite oxide subportion 8b (−25/+60 mesh).

Using a typical laboratory scale sized version of continuous-feed furnace assembly 1, the continuous-feed thermal exfoliation of graphite oxide described in the immediately preceding paragraph is capable of producing highly exfoliated graphite at a rate of about 120 g of the highly exfoliated graphite per hour.

TABLE 1

(ultra)highly exfoliated graphite of Comparative Examples (CE) 2 to 4 and invention Examples (EX) 1b, 2 to 7, and 8a to 8e prepared from graphite oxide (GO) cake with indicated collection and washing procedures

| Sample Tested | GO cake collection and wash procedures | Exfoliation Temp. (° C.) | BET surface area (m²/g) | Median particle size (μm) |
|---|---|---|---|---|
| CE2 | Centrifuge to collect GO cake and wash 3 times with room temperature deionized water | 900° C. | 650 | 11.1 |
| CE3 | Filter to collect GO cake and wash 1 time with room temperature deionized water | 900° C. | 783 | 43 |
| CE4 | Centrifuge to collect GO cake and wash 3 times with room temperature deionized water | 1000° C. | 828 | ND* |
| EX1b | Centrifuge to collect GO cake and wash 3 times with room temperature deionized water | 900° C. | 1136 | 4.4 |
| EX2 | Centrifuge to collect GO cake and wash 3 times with room temperature deionized water | 900° C. | 1136 | 6.7 |

TABLE 1-continued (ultra)highly exfoliated graphite of Comparative Examples (CE) 2 to 4 and invention
Examples (EX) 1b, 2 to 7, and 8a to 8e prepared from graphite oxide (GO) cake
with indicated collection and washing procedures

| Sample Tested | GO cake collection and wash procedures | Exfoliation Temp. (° C.) | BET surface area (m²/g) | Median particle size (μm) |
|---|---|---|---|---|
| EX3 | Centrifuge to collect GO cake and wash 4 times with room temperature deionized water | 900° C. | 980 | 8.0 |
| EX4 | Filter to collect GO cake and wash 1 time with room temperature deionized water | 900° C. | 1067 | 191/55** |
| EX5 | Filter to collect GO cake and wash 2 times with room temperature deionized water | 900° C. | 1052 | 71 |
| EX6 | Filter to collect GO cake and wash 1 time with hot deionized water (about 55° C.) | 900° C. | 1005 | 79 |
| EX7 | Filter to collect GO cake, resuspend 1 time in hot deionized water, and refilter | 900° C. | 1043 | 68 |
| EX8a to EX8e | Centrifuge to collect GO cake and wash 3 times with room temperature deionized water | 1000° C. | 827 m²/g to 953 m²/g | ND |

*ND means not determined;
**bimodal distribution maxima

Example 9

Poly(ethylene-co-vinyl acetate)-Ultrahighly Exfoliated Graphite Composite

Prepare the poly(ethylene-co-vinyl acetate)-ultrahighly exfoliated graphite composite of Example 9 and calculate its resistivity according to the respective procedures of Comparative Example 5 except use the ultrahighly exfoliated graphite product of Example 8b instead of the ultrahighly exfoliated graphite of Comparative Example 4. Resistivity of the poly(ethylene-co-vinyl acetate)-ultrahighly exfoliated graphite composite of Example 9 is 30 ohm-centimeters. Accordingly, the poly(ethylene-co-vinyl acetate)-ultrahighly exfoliated graphite composite of Example 9 is a more conductive filler than is the poly(ethylene-co-vinyl acetate)-ultrahighly exfoliated graphite composite of Comparative Example 5, which as mentioned previously has a higher resistivity of 72 ohm-centimeters.

As shown by the Examples and the data in Table 1 above, freeze-dried isolated graphite oxide prepared from graphite via the Staudenmaier synthesis or variant thereof according to the process of the first embodiment is of substantially higher quality, especially as an intermediate for preparing highly exfoliated graphite for filler purposes, compared to the quality of oven-dried graphite oxide prepared from graphite via the same Staudenmaier synthesis or variant thereof. For example, the freeze-dried isolated graphite oxide produced by the process of the first embodiment of the present invention is capable of producing an ultrahighly exfoliated graphite having a BET surface area of 900 m²/g or higher versus a BET surface area of ultrahighly exfoliated graphite produced from the oven-dried graphite oxide of 783 m²/g or less. Further, the median particle size of the former ultrahighly exfoliated graphite (produced from freeze-dried isolated graphite oxide) is significantly lower than the median particle size of the latter ultrahighly exfoliated graphite (produced from oven-dried graphite oxide). The Examples also show that the continuous-feed furnace assembly of the second embodiment is useful in the continuous-feed thermal exfoliation process of the third embodiment, which together produce ultrahighly exfoliated graphite that can be used to make polymer-ultrahighly exfoliated graphite composites having significantly lower (less than 50% of) resistivity than resistivity of corresponding polymer-ultrahighly exfoliated graphite composites produced by a conventional batch thermal exfoliation process.

While the present invention has been described above according to its preferred embodiments, it can be modified within the spirit and scope of this disclosure. This application is therefore intended to cover any variations, uses, or adaptations of the present invention using the general principles disclosed herein. Further, the application is intended to cover such departures from the present disclosure as come within the known or customary practice in the art to which this present invention pertains and which fall within the limits of the following claims.

What is claimed is:

1. A continuous-feed furnace assembly comprising a flow-through oven, a means for continuously adding a particulate precursor material, and a means for collecting a particulate product material, the flow-through oven defining spaced-apart particulate inlet and outlet apertures in a top thereof and an enclosed volumetric space between the particulate inlet and outlet apertures, the flow-through oven being capable of heating the enclosed volumetric space at a temperature of from 600 degrees Celsius to 1600 degrees Celsius; the means for continuously adding a first particulate material being in sequential fluid communication with the particulate inlet aperture, enclosed volumetric space, and particulate outlet aperture of the flow-through oven and the means for collecting a particulate product material, thereby establishing a particulate flow pathway, wherein a second gas inlet aperture, being in the bottom of the oven and in sequential fluid communication with the enclosed volumetric space and particulate outlet aperture of the flow-through oven and the means for collecting a particulate product material, and wherein the enclosed volumetric space does not include a frit.

2. The continuous-feed furnace assembly as in claim 1, wherein the flow-through oven further defining a gas inlet aperture, the gas inlet aperture being spaced apart from the particulate outlet aperture and in sequential fluid communication with the enclosed volumetric space and particulate outlet aperture of the flow-through oven and the means for collecting a particulate product material, thereby establishing a gas flow pathway.

3. A continuous-feed furnace assembly of claim 2, wherein the particulate precursor material is graphite oxide.

4. A continuous-feed furnace assembly of claim 2, wherein the particulate product material is exfoliated graphite.

5. A continuous-feed furnace assembly of claim 4, wherein the exfoliated graphite has a surface area of at least 800 m$^2$/g.

6. A continuous-feed furnace assembly of claim 1, wherein the particulate precursor material is graphite oxide.

7. A continuous-feed furnace assembly of claim 1, wherein the particulate product material is exfoliated graphite.

8. A continuous-feed furnace assembly of claim 7, wherein the exfoliated graphite has a surface area of at least 800 m$^2$/g.

9. A continuous-feed furnace assembly of claim 1, wherein means for collecting a particular product material comprises a porous filter frit in a filter assembly.

10. A continuous-feed furnace assembly of claim 9, wherein the filter assembly is in fluid communication to the flow through oven.

11. A continuous-feed furnace assembly of claim 10, wherein a vacuum source is in sealing operative contact to and fluid communication with the filter assembly.

12. A continuous-feed furnace assembly of claim 1, wherein the flow through oven comprises quartz.

* * * * *